United States Patent [19]

Shek

[11] Patent Number: 5,029,061

[45] Date of Patent: Jul. 2, 1991

[54] EMERGENCY LIGHTING SYSTEM

[76] Inventor: Kwei C. Shek, 16 Fort Street, B/F. North Point, Hong Kong

[21] Appl. No.: 395,610

[22] Filed: Aug. 18, 1989

[30] Foreign Application Priority Data

Aug. 20, 1988 [GB] United Kingdom ................. 8819824

[51] Int. Cl.$^5$ ..................... H02M 3/335; H05B 37/02; H05B 39/04; G05F 1/00
[52] U.S. Cl. ........................................ 363/21; 363/95; 363/97; 363/49; 315/291; 315/DIG. 2; 315/DIG. 5;DIG. 7
[58] Field of Search ..................... 363/17-26, 363/95, 98, 49, 131, 132; 315/291, DIG. 2, DIG. 5, DIG. 7; 307/64, 65, 66

[56] References Cited

U.S. PATENT DOCUMENTS

| | | | |
|---|---|---|---|
| 4,673,826 | 6/1987 | Masson | 307/66 |
| 4,694,224 | 9/1987 | Nakagawa et al. | 315/DIG. 7 X |
| 4,698,741 | 10/1987 | Pacholok | 363/18 X |
| 4,700,113 | 10/1987 | Stupp et al. | 315/DIG. 2 X |
| 4,788,451 | 11/1988 | Stoet | 307/66 |
| 4,806,830 | 2/1989 | Ueki | 315/DIG. 2 X |

Primary Examiner—Steven L. Stephan
Assistant Examiner—Emanuel T. Voeltz
Attorney, Agent, or Firm—Knobbe, Martens, Olson & Bear

[57] ABSTRACT

A circuit 10 for supply a fluorescent tube 12 comprises a power supply 14 which modulates the mains supply at 24 to produce a DC supply at 16. A relay J and a switch S2 apply the DC supply to a terminal 38. The power supply 14 also supplies a charging current at 30 to a battery pack 32. The supply at 38 powers an oscillator circuit 18 which incorporates inductors L1, L2 which are windings on a transformer 20. A secondary winding 22 taps the transformer 20 to supply the tube 12. A third winding L3 detects the voltage being applied to the tube 12 and a feedback circuit 40 controls the output amplitude of the oscillator 18 in order to maintain a constant supply voltage to the tube 12.

8 Claims, 1 Drawing Sheet

EMERGENCY LIGHTING SYSTEM

BACKGROUND OF THE INVENTION

The present invention relates to electrical supply circuits for lighting and in particular, but not exclusively, to circuits for fluorescent fixtures.

SUMMARY OF THE INVENTION

According to the invention there is provided a supply circuit for lighting, comprising a power supply operable to provide a DC supply, an oscillator circuit powered by the DC supply and incorporating an inductor, and a transformer having a secondary winding connected to the lighting, and a primary winding formed by the inductor.

Preferably, the oscillator circuit comprises a transistor, the inductor being connected between the positive side of the DC supply and the collector of the transistor, the emitter of the transistor being grounded, and the base of the transistor being connected through a parallel resistor and capacitor to a second inductor which is connected to the positive side of the DC supply, there being a capacitor connected between the base and the emitter of the transistor. Preferably the second inductor forms a third winding on the transformer.

The circuit preferably further comprises a feedback circuit operable to maintain a substantially constant magnitude of supply voltage to the lighting. The feedback circuit may provide a control voltage to control the output voltage supplied to the transformer by the oscillator circuit. The control voltage may be applied to the base of the said transistor. The feedback circuit may comprise a fourth winding on the transformer, for detecting the voltage being applied to the lighting. The fourth winding is preferably connected across a rectifier circuit, the output of the rectifier being used to provide the control voltage for the oscillator. The output of the rectifier is preferably amplified before being supplied to the oscillator circuit. The output of the rectifier may be applied to the base of a second transistor, the collector and emitter of the second transistor forming a connection between the base of the first transistor and a side of the DC supply. The second transistor is preferably a pnp transistor connected between the said base and the negative side of the DC supply.

Preferably the power supply comprises a rectifier for providing a DC supply at a first terminal which is connected to the oscillator circuit via a switch. The power supply may further comprise a relay operable to provide the output of the rectifier as the output of the power supply while the power supply is connected to an AC supply, and to provide the output of a battery as the output of the power supply in the event of a failure of the AC supply. The battery may be rechargeable and connected for charging from the rectifier, whereby the battery is recharged whenever the power supply is connected to an AC supply.

BRIEF DESCRIPTION OF THE DRAWING

One embodiment of the present invention will now be described in more detail, by way of example only, and with reference to the accompanying drawing, which is a circuit diagram of the embodiment.

DETAILED DESCRIPTION OF THE INVENTION

Figure 1:
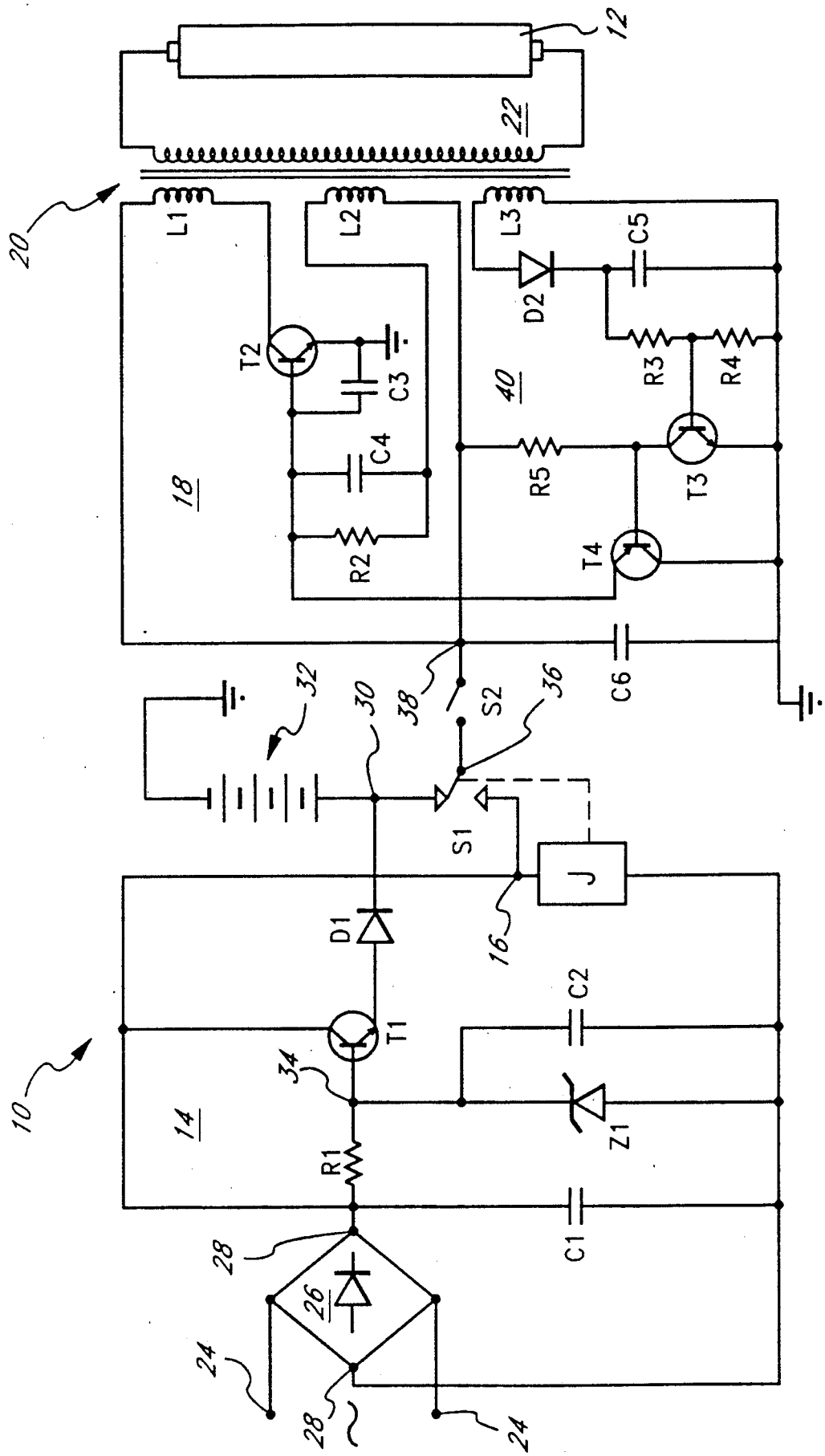

The supply circuit 10 shown in the drawing is for lighting such as a fluorescent tube 12. The circuit 10 comprises a power supply 14 operable to provide a DC supply at 16, an oscillator circuit 18 powered by the DC supply 16 and incorporating an inductor L1, and a transformer 20 having a secondary winding 22 connected to the lighting 12, and a primary winding formed by the inductor L1.

In more detail, the power supply 14 has contacts 24 for connection to the terminals of an AC supply. A diode bridge 26 rectifies the AC supply to provide DC at terminals 28. A capacitor C1 connected across the terminals 28 smooths the rectified supply to provide a DC output at 16.

A second output of the power supply 14 is provided at 30 and consists of a charging current for a rechargeable battery pack 32. The charging current at 30 is the emitter current of a npn transistor T1, whose collector is connected to the rectified, smoothed DC supply at 16. The base of T1 is supplied by a voltage set by a resistor R1 and Zener diode Z1 connected in series across the terminals 28. A capacitor C2 is connected in parallel with the Zener diode Z1. Thus, a constant voltage is provided at the terminal 30 common to the resistor R1, the transistor T1, the Zener diode Z1, and the capacitor C2. This maintains a constant charging current to the battery pack 32. A diode D1 prevents the battery pack 32 discharging through the power supply 14.

The power supply also includes a relay having a winding J connected across the DC supply from the rectifier 26. The winding controls the state of a switch S1. The switch S1 has two inputs connected to the DC supply at 16 and the positive side of the battery pack 32, respectively, and an output at 36 connected through a second switch S2 to a terminal 38 which constitutes the positive power supply of the oscillator 18. The voltage at 38 is further smoothed by a capacitor C6.

The drawing shows the state of the switch S1 when no current flows through J. Switch S1 is in a condition which connects the oscillator 18 to the battery pack 32 when switch S2 is closed. In the event of a current being applied to the winding J, switch S1 changes to its other condition in which the DC supply at 16 is available when switch S2 is closed.

In the normal condition, when the AC supply to the terminals 24 is undisturbed, it will be apparent from the above that a DC current will flow through the winding J so that the switch S1 is held in the condition in which the DC supply at 16 is available. The battery packs 32 will be charging through transistor T1, unless already fully charged.

In the event of any disruption, such as a power failure or disconnection of the terminals 24, the switch S1 swings to its other condition as illustrated, so that the battery pack 32 can provide a DC supply to the oscillator 18.

The oscillator 18 is based around a transistor T2 which is an npn transistor having its collector connected through the winding L1 to the terminal 38. The emitter of transistor T2 is grounded. A capacitor C3 is connected across the base and emitter. The base is also connected to the terminal 38, through a parallel resistor and capacitor R2, C4 which are in series with a second winding L2 on the transformer 20.

The windings L1, L2 form primary windings on the transformer 20, whose secondary winding is the winding 22. The circuitry around the transistor T2 forms an oscillator circuit driven by the DC supply at 38 to oscillate and so provide power through the windings L1, 22 of the transformer 20 to the tube 12.

A further section 40 of the circuit is a feedback circuit which works between a third primary winding L3 on the transformer to provide a control voltage to the base of the transistor T2 in order to maintain a constant supply power to the tube 12.

The voltage picked off the transformer 20 by the winding L3 is first rectified by a diode D2 and capacitor C5 in series. The common terminal of the diode D2 and capacitor C5 provides a voltage to a voltage divider formed by two series resistors R3, R4. The voltage at the common terminal of the resistors R3, R4 is amplified by a common emitter amplifier comprising a transistor T3 and a resistor R5 connected between the collector of transistor T3 and the positive supply at 38. The output of the amplifier (the collector voltage) is applied to a pnp transistor connected between the base of transistor T2 and ground.

In use, the terminals 24 will normally be connected to an uninterrupted AC supply. Thus, the AC supply will be rectified to produce a DC supply at 16 which is supplied to the point 38 through the switches S1 and S2. In this condition, the switch S1 will remain closed between the junctions 16 and 36. Switch S2 is closed when it is desired to illuminate the tube 12. The DC supply at 38 causes the oscillator 18 to oscillate, thereby providing a voltage to the transformer 20 which is picked off by the secondary winding 22 for supplying the tube 12.

A voltage is also picked off the transformer 20 by the winding L3 and the feedback circuit 40 uses this voltage to provide negative feedback to the base of transistor T2, to stabilize the oscillator output voltage and thereby ensure a constant supply voltage is applied to the tube 12.

In the event of any failure of the AC supply at 24, the current through the winding J will stop, and the switch S1 will change condition, in order to connect the battery pack 32 to provide the DC supply at 38. The oscillator 18 will then continue to operate, having been re-stabilized to the original output voltage by the operation of the feedback circuit 40.

The following components and component values may be used in the circuit shown in the drawing:

| Component Reference | Component Type or Value |
| --- | --- |
| Diode Bridge | 50 V, 5 A diodes |
| T1 | C1826 |
| T2 | C1826 |
| T3 | C1826 |
| T4 | C9012 |
| R1 | 560 Ohms. |
| R2 |  |
| R3 | 200 Ohms. |
| R4 | 22 Ohms. |
| R5 | 18k Ohms. |

-continued

| Component Reference | Component Type or Value |
| --- | --- |
| C1 | 50 V, 470 $\mu$F. |
| C2 | 0.33 $\mu$F. |
| C3 | 0.015 $\mu$F. |
| C4 |  |
| C5 | 10 Volts, 22 $\mu$F. |
| C6 | 35 Volts, 470 $\mu$F. |
| Z1 | 14 Volts. |
| D1 | N5401 |
| D2 | 1N4001 |

It is believed that the circuit described above will provide a saving in the electricity requirements of fluorescent tubes. This is partly by virtue of the use of a low voltage DC circuit, and partly because the starter normally used for fluorescent tubes is no longer required.

It will be apparent that many variations and modifications may be made to the circuit described above without departing from the spirit and scope of the present invention. In particular, different components values can be used, and other types of oscillator, feedback and power supply circuits could be used.

What is claimed is:

1. A supply circuit for lighting, comprising:
 a power supply operable to provide a DC supply;
 an oscillator circuit powered by the DC supply and incorporating an inductor, wherein the oscillator circuit comprises a transistor, the inductor being connected between the positive side of the DC supply and the collector of the transistor, the emitter of the transistor being grounded, and the base of the transistor being connected through a parallel resistor and capacitor to a second inductor which is connected to the positive side of the DC supply, there being a capacitor connected between the base and the emitter of the transistor; and
 a transformer having a secondary winding connected to the lighting, and the primary winding formed by the inductor.

2. A circuit according to claim 1, wherein the second inductor forms a third winding on the transformer.

3. A circuit according to claim 1 or 2, wherein the circuit further comprises a feedback circuit operable to maintain a substantially constant magnitude of supply voltage to the lighting.

4. A circuit according to claim 3, wherein the feedback circuit provides a control voltage to control the output voltage supplied to the transformer by the oscillator circuit.

5. A circuit according to claim 4, wherein the control voltage is applied to the base of the said transistor.

6. A circuit according to claim 2, wherein the feedback circuit comprises a fourth winding on the transformer, for detecting the voltage being applied to the lighting.

7. A circuit according to claim 6, wherein the fourth winding is connected across a rectifier circuit, the output of the rectifier being used to provide the control voltage for the oscillator.

8. A circuit according to claim 7, wherein the output in the rectifier is amplified before being supplied to the oscillator circuit.

* * * * *